(12) United States Patent
Schultz

(10) Patent No.: US 9,962,841 B2
(45) Date of Patent: May 8, 2018

(54) GANTRY ROBOT SYSTEM WITH EXPANDABLE WORKPIECE FEEDER

(71) Applicant: Jeffrey R. Schultz, Dayton, OH (US)

(72) Inventor: Jeffrey R. Schultz, Dayton, OH (US)

(73) Assignee: PRODUCTION DESIGN SERVICES, INC., West Carrollton, OH (US)

( * ) Notice: Subject to any disclaimer, the term of this patent is extended or adjusted under 35 U.S.C. 154(b) by 397 days.

(21) Appl. No.: 14/879,535

(22) Filed: Oct. 9, 2015

(65) Prior Publication Data
US 2016/0274575 A1 Sep. 22, 2016

Related U.S. Application Data

(63) Continuation-in-part of application No. 14/663,051, filed on Mar. 19, 2015, now Pat. No. 9,662,785.

(51) Int. Cl.
| | |
|---|---|
| *B25J 18/00* | (2006.01) |
| *B25J 9/02* | (2006.01) |
| *B25J 11/00* | (2006.01) |
| *B25J 5/02* | (2006.01) |
| *G05B 19/418* | (2006.01) |
| *G06F 19/00* | (2011.01) |

(52) U.S. Cl.
CPC ............ *B25J 18/005* (2013.01); *B25J 5/02* (2013.01); *B25J 9/026* (2013.01); *B25J 11/005* (2013.01); *G05B 19/41865* (2013.01); *G05B 2219/50386* (2013.01); *Y10S 901/02* (2013.01)

(58) Field of Classification Search
CPC .............. G05B 19/41865; G05B 15/02; G05B 2219/50386; Y02P 90/02; Y10S 901/02; B25J 9/026; B25J 5/02; B25J 11/005

USPC ................................................. 700/114, 186
See application file for complete search history.

(56) References Cited

U.S. PATENT DOCUMENTS

| | | | | |
|---|---|---|---|---|
| 2,095,309 | A | * 10/1937 | Brackett | ................ B26D 7/016 83/239 |
| 4,092,719 | A | 5/1978 | Salmon | |
| 4,160,471 | A | 7/1979 | Lapointe | |

(Continued)

FOREIGN PATENT DOCUMENTS

CN          103273490          9/2013

OTHER PUBLICATIONS

Notice of Allowance, U.S. Appl. No. 14/663,051 (dated Apr. 11, 2017).

(Continued)

*Primary Examiner* — Ryan D. Coyer
(74) *Attorney, Agent, or Firm* — Thompson Hine LLP

(57) ABSTRACT

A gantry robot system may include a gantry, a slide movably mounted on the gantry, an articulated arm mounted on the slide for performing a machining operation, a workpiece feeder for moving a workpiece relative to the gantry, the workpiece feeder having a first guide element mounted on and selectively positionable on the gantry, and a second guide element movably mounted on the gantry, the second guide element connected to and selectively positionable by the first guide element to engage workpieces of varying widths, and a computer control connected to actuate the slide, the articulated arm, and the workpiece feeder in a coordinated manner to perform a preselected machining operation on the workpiece.

20 Claims, 8 Drawing Sheets

(56) References Cited

U.S. PATENT DOCUMENTS

| | | | | |
|---|---|---|---|---|
| 4,513,899 A | * | 4/1985 | Ledgerwood | B65H 20/18 226/141 |
| 4,633,055 A | | 12/1986 | Conley | |
| 4,693,761 A | * | 9/1987 | Bohm | B23K 7/10 148/196 |
| 5,120,178 A | * | 6/1992 | Ito | B21D 43/20 414/222.07 |
| 5,127,328 A | | 7/1992 | Wieland | |
| 5,328,317 A | * | 7/1994 | Masui | H05K 13/0434 198/345.1 |
| 5,359,542 A | | 10/1994 | Pahmeier | |
| 5,816,774 A | * | 10/1998 | Stolzer | B65G 1/0442 294/97 |
| 5,839,323 A | * | 11/1998 | Line | B23Q 1/012 408/37 |
| 2003/0066574 A1 | * | 4/2003 | Lovchik | B27C 9/00 144/382 |
| 2003/0079964 A1 | | 5/2003 | Kilabarda | |
| 2005/0036879 A1 | * | 2/2005 | Jhaveri | B25J 9/0084 414/751.1 |
| 2008/0058986 A1 | * | 3/2008 | Moldenhauer | B23H 11/00 700/245 |
| 2009/0118858 A1 | * | 5/2009 | Wallace | B23P 19/001 700/110 |
| 2012/0312862 A1 | | 12/2012 | Landoll | |

OTHER PUBLICATIONS

U.S., Office Action, U.S. Appl. No. 14/663,051 (dated Sep. 28, 2016).
Webpage featuring "Kawasaki Robotics" by EXPO21XX Online Exhibitions, http://www.expo21xx.com/automation21xx/14735_st3_robotics/default.htm (first publication at least as early as Feb. 2010).
Product Information featuring "KR16" by Kuka http://www.kuka-robotics.com/en/products/industrial_robots/low/kr16_2/start.htm (first publication at least as early as Dec. 2009).
Webpage featuring "Kuka KR16L8-3 Arc HW" by RobotWorx a Scott company, http://www.robots.com/kuka/kr-16-l8-3-arc-hw (first publication at least as early as Jul. 2013).
Product Information featuring "Arc Welding Robots" by Fanuc America Corporation, http://robot.fanucamerica.com/products/robots/arc-welding-robots.aspx (retrieved from the internet on Dec. 16, 2015, first publication at least as early as Jul. 2014).
Webpage featuring "IRB 2600ID—Industrial Robots—Robotics/ABB", http://new.abb.com/products/robotics/industrial-robots/irb-2600id (retrieved from the internet on Dec. 16, 2015, first publication at least as early as Jul. 2014).
ABB Robotics, "IRB 6620LX Industrial robot on linear axis" (May 2010).
Macron Dynamics, Inc., "Gantry Systems: Working Outside the Envelope," http://www.macrondynamics.com/job-stories/gantry-systems-overview (Mar. 2015).
PDSI Robotic Welding Systems, "$P^3$ Positioning Solutions" (first publication at least as early as Mar. 18, 2015).
Robotworx "Fanuc Gantry System Workcell" (first publication at least as early as Mar. 18, 2015).
Yaskawa Motoman Robotics, "HP20 Robot" (Sep. 2014).
Yaskawa Motoman Robotics, "MH24 Robot" (Jan. 2015).
Webpage featuring "RS010L Robot High Speed, High-Performance Industrial Robots" by Kawasaki Robotics, https://robotics.kawasaki.com/en/products/robots/small-medium-payloads/RS010L/?language_id=1(retrieved from the internet on Dec. 16, 2015).
Webpage featuring "RS015X Robot, High Speed, High-Performance Industrial Robots" by Kawasaki Robotics, https://robotics.kawasaki.com/en/products/robots/small-medium-payloads/RS015X/?language_id=1 (retrieved from the internet on Dec. 16, 2015.
Product Information featuring "KR 16 arc HW, KR 16 L8 arc HW" by Kuka http://www.kuka-robotics.com/res/sps/f776ebab-f613-4818-9feb-527612db8dc4_PF0036_KR_16_arc_HW_en.pdf (retrieved from the internet on Dec. 16, 2015).
Product Information featuring "ARC Mate® 120iC & 120iC/10L", by Fanuc Robotics, http://www.fanucrobotics.com/cmsmedia/datasheets/ARC%20Mate%20120iC%20Series_8.pdf (retrieved from the internet on Dec. 16, 2015).
Webpage featuring "IRB 2600ID—Industrial Robots—Robotics/ABB" http://new.abb.com/products/robotics/industrial-robots/irb-2600id (retrieved from the internet on Dec. 16, 2015).
U.S., Office Action, U.S. Appl. No. 14/879,520 (dated Oct. 19, 2017).

\* cited by examiner

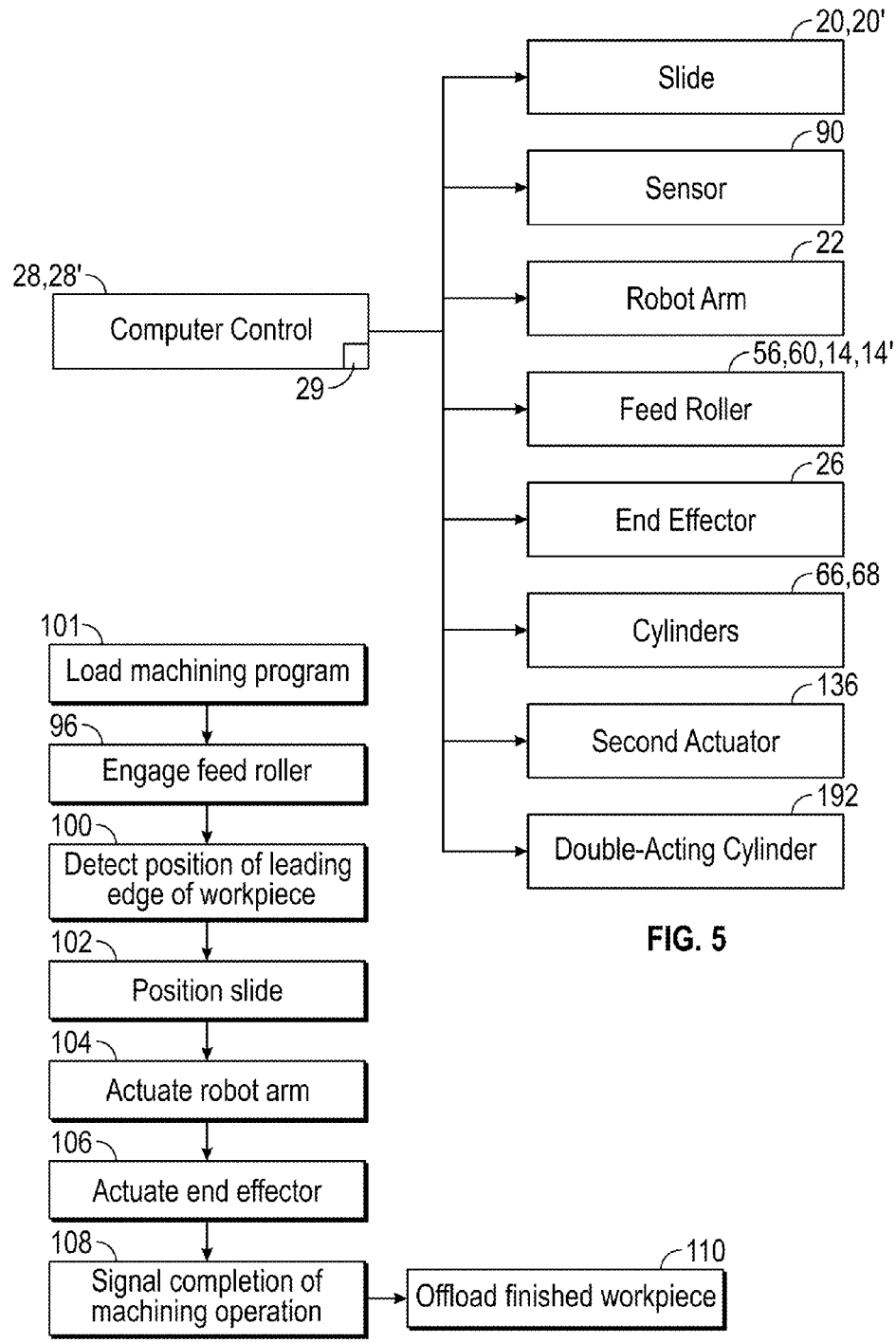

GANTRY ROBOT SYSTEM WITH EXPANDABLE WORKPIECE FEEDER

FIELD

This disclosure relates to robot systems, and more particularly, to robot systems in which a robot arm is mounted on a gantry to perform a machining operation.

BACKGROUND

Manufacturing operations are becoming increasingly automated. A significant factor in increasing such automation is the use of robots to perform repetitive tasks that require multiple, high-precision movements. Another factor favoring the use of robots is that a robot can perform a machining task in an environment, or using tools, that may pose a risk to humans. For example, a robot may be used to perform a machining operation that utilizes a plasma torch to cut metal such as steel. The use of a plasma torch generates extremely high temperatures, electric arcs, noxious gases, and a spray of molten metal.

There are several forms of robot devices that may be used to perform machining tasks. In one form, a machining tool, such as a plasma torch, an arc welder, or other device, may be mounted on an end of a machining tool that is moved by rails oriented at right angles to each other to move the machining tool in an X-Y direction, so that the machining operation follows a pattern in the form of Cartesian coordinates. An advantage of such a system is that it is relatively inexpensive, and can be repaired relatively quickly.

A robot also may take the form of a robotic arm. Such robotic arms may be computer controlled and include an end effector, which may be a plasma torch, connected to a swivel base by articulated segments. The swivel base and articulated segments give the robot arm flexible movement in three dimensions. However, such robotic arms are limited in reach to the collective length of the articulated arm segments. Such articulated robotic arms may be mounted on a gantry so that the robot arm itself may be displaced along the gantry rail to provide added reach, or to perform a task in more than one workspace. The size of a workpiece that may be operated on may be limited by the size of the gantry and the reach of the robotic arm.

Accordingly, there is a need for a gantry robot system that provides maximum flexibility of positioning of the end effector of the robot arm, and can accommodate a wide range of workpiece sizes within a minimal footprint.

SUMMARY

The present disclosure is a gantry robot system that, in various aspects, provides flexibility in positioning the end effector of the robot arm, and accommodates a wide range of workpiece sizes and widths within a minimal footprint. In one aspect, a gantry robot system includes a gantry; a slide movably mounted on the gantry; an articulated arm mounted on the slide for performing a machining operation; a workpiece feeder for moving a workpiece relative to the gantry, the workpiece feeder having a first guide element mounted on and selectively positionable on the gantry, and a second guide element movably mounted on the gantry, the second guide element connected to and selectively positionable by the first guide element to engage workpieces of varying widths; and a computer control connected to actuate the slide, the articulated arm, and the workpiece feeder in a coordinated manner to perform a preselected machining operation on the workpiece.

In another aspect, a gantry robot system includes a gantry having a linear rail, first and second upright supports supporting the linear rail, and a lower transverse brace attached to and extending between the upright supports; a slide movably mounted on the gantry; an articulated arm mounted on the slide and adapted to receive an end effector for performing a machining operation on a workpiece; a workpiece feeder having a first guide element mounted and selectively positionable along the linear rail, and a second guide element movably mounted on the linear rail, the second guide element connected to and selectively positionable by the first guide element along the linear rail to accommodate a width of the workpiece and engage the workpiece to move the workpiece relative to the gantry; and a computer control connected to actuate the workpiece feeder, the first guide element of the workpiece feeder, the slide, and the articulated arm in a coordinated manner such that the end effector in positioned to perform a preselected machining operation on the workpiece.

In yet another aspect, a method for making a gantry robot system includes forming a gantry having a linear rail, first and second upright supports supporting the linear rail, and a lower transverse brace attached to and extending between the upright supports; mounting a slide movably on the linear rail of the gantry; mounting an articulated arm on the slide that is adapted to receive an end effector for performing a machining operation; mounting a selectively positionable first guide element of a workpiece feeder on the gantry, the first guide element having an actuator; mounting a second guide element on the gantry, and connecting the second guide element to the actuator of the first guide element; and connecting a computer control to the slide, that articulated arm, and the actuator, and programming the computer control to actuate the workpiece feeder, the slide, and the articulated arm in a coordinated manner to displace the second guide element to engage and move a workpiece relative to the linear rail, and the articulated arm to enable the end effector to perform a preselected machining operation on the workpiece.

Other objects and advantages of the disclosed robot gantry system will be apparent from the following description, the accompanying drawings, and the appended claims.

BRIEF DESCRIPTION OF THE DRAWINGS

FIG. 5 is a schematic of the computer control system of the gantry robot system of FIGS. 1 and 7;

FIG. 6 is a flow chart of the operation of the computer control of the gantry robot system of FIGS. 1 and 7;

DETAILED DESCRIPTION

Figure 1:
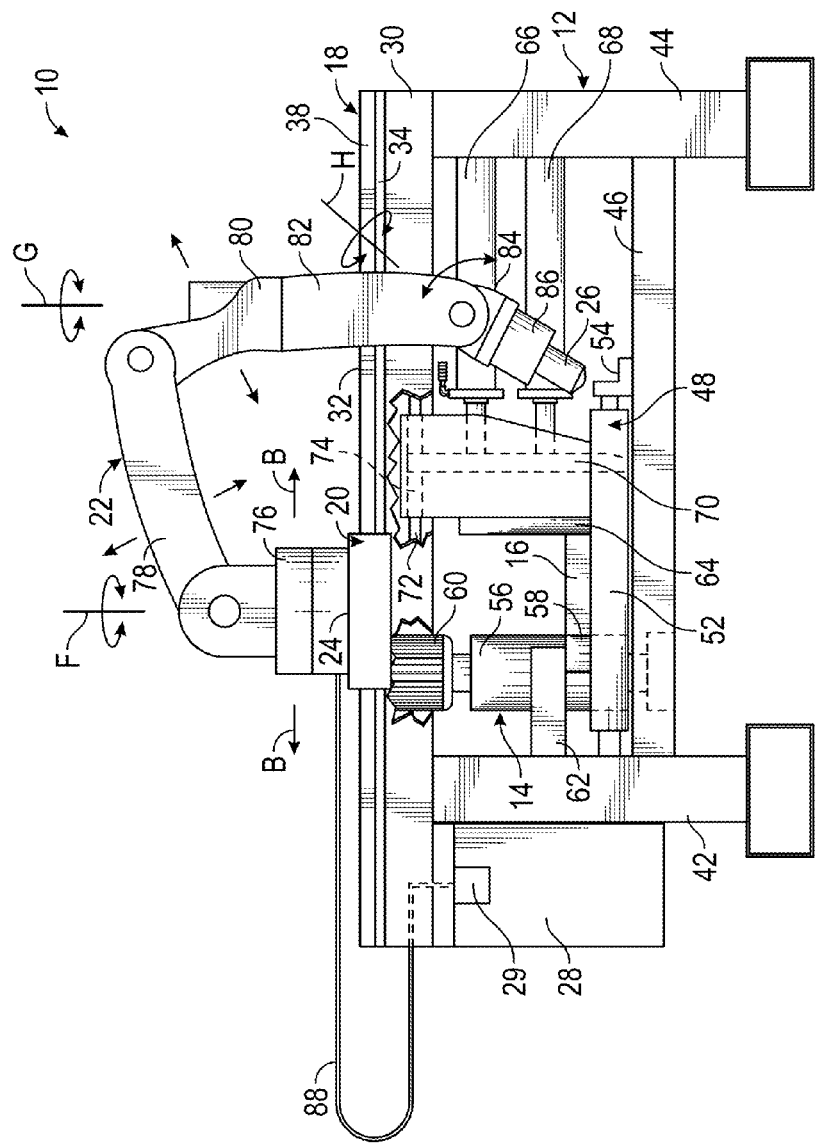
FIG. 1 is a somewhat schematic, front elevational view of one aspect of the disclosed gantry robot system.

As shown in FIG. 1, the disclosed robot gantry system, generally designated 10, may include a workpiece support, generally designated 12, a workpiece feeder, generally designated 14, for engaging a workpiece 16, which may take the form of a flat plate or an I-beam, and for moving the workpiece in a first direction, indicated by arrow A (see FIG. 2) relative to the workpiece support. The system 10 may also include a gantry, generally designated 18, and a slide 20 moveably mounted on the gantry and moveable in a second direction, indicated by arrows B different from the direction of movement of the workpiece by the workpiece feeder 14.

An articulated arm, which in an embodiment may take the form of an articulated robot arm, generally designated 22, may be mounted on an upper surface 24 of the slide 20 and may have an end effector 26 at an end of the articulated arm opposite the slide 20. In robotics, an end effector is a device at the end of a robot arm designed to interact with the environment. The exact nature of the end effector depends on the application of the robot. The system 10 also may include a computer control 28 (see also FIG. 5), which in embodiments may include, or communicate with, or communicate with other components of the system 10 through, a programmable logic controller (PLC) component 29. The computer control 28 may be connected to actuate the workpiece feeder 14, the slide 20, the articulated arm 22 and the end effector 26 in a coordinated manner to perform a preselected machining operation. As shown in FIG. 5, the computer control 28 may be connected to actuate the various movable components of the system 10, which will be described.

In an embodiment, the end effector 26 may take a form selected from a plasma torch, an arc welder, an abrasive grinder, an adhesive applicator, a seal dispenser, a drill, and a stylus for marking or scribing, among other tools. Applicable plasma cutting systems may include Hypertherm Inc. HyDefinition Plasma Cutting Systems models HPR800XD, HPR400HD, HPR260XD, HPR130XD; Hypertherm Inc. Air and $O_2$ plasma cutting system models MaxPro 200 and HSD130; and Thermal-Dynamics high precision plasma cutting system model Ultra-Cut XT systems from 100-400 amps output.

Figure 2:
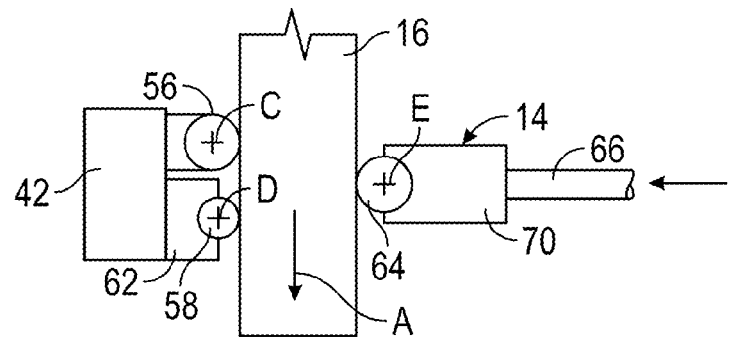
FIG. 2 is a detail of the gantry robot system of FIG. 1, showing the relative spatial orientation of the powered roller, the guide roller, and the clamping roller.

In an embodiment, the gantry 18 may be positioned above the workpiece support 12, and may include a linear rail 30. The slide 20 may be mounted on the rail 30 to slide along the top surface 32 of the rail. As shown in FIGS. 1 and 2, the slide 20 may include opposing, inwardly facing slots 34, 36 shaped to receive and engage opposing, longitudinal ribs 38, 40, respectively, extending outwardly from opposing vertical side walls forming the linear rail 30. In an embodiment, the slide 20 may be supported on, and slide along, the ribs 38, 40 to provide clearance above the top surface 32 of the rail. The slide 20 may be moved in the direction of arrows B (FIG. 1) by a rack and pinion 41 internal to the rail 30 (FIG. 2). In an embodiment, the linear rail 30 may be oriented substantially perpendicular to the direction of travel of the workpiece 16 indicated by arrow A in FIG. 2. With such an orientation, the slide 20 may be moveable in the direction indicated by arrows B that is substantially perpendicular to the feed direction indicated by arrow A.

As shown in FIG. 1, the workpiece support 12 may include first and second upright supports 42, 44, a lower transverse brace 46 that extends between and is attached to the upright supports, and a roller support, generally designated 48, for the workpiece 16 that extends substantially horizontally. The linear rail 30 of the gantry 18 may be mounted on and supported by the first and second upright supports 42, 44, so that the linear rail adds stiffness to, and may form a structural component of, the workpiece support 12.

In an embodiment, the workpiece roller support 48 may include rollers 50, 52 (see FIG. 3) that may be rotatably mounted on the upright 42 at one end, and an L-bracket 54 the rotatably receives the rollers at an opposite end. The L-bracket 54 may be mounted on the lower transverse brace 46. The workpiece feeder 14 may include at least one powered roller 56 and a guide roller 58. The powered roller 56 may be rotatably mounted to the workpiece support 12, and in embodiments mounted on the first upright support 42. The powered roller 56 may driven by a motor 60 that is mounted on the linear rail 30 of the gantry 18, and is powered and actuated by the computer control 28.

In embodiments, the motor 60 may take the form of a servomotor, such as an electric servomotor. As shown in FIG. 2, the powered roller 56 and the guide roller 58 may be aligned relative to each other to guide the workpiece 16 in the feed direction indicated by arrow A. In embodiments, the workpiece feeder 14 may include a powered roller 56 in the form of multiple powered rollers. The guide roller 58 may be rotatably mounted on a bracket 62 that in turn is attached to the first upright support 42 of the workpiece support 14 (see FIG. 2).

In an embodiment, the workpiece feeder 14 of the gantry robot system 10 may include a clamping roller 64 for urging the workpiece 16 against the powered roller 56 and the guide roller 58 (see FIGS. 1 and 2). The computer control 28 may be configured to actuate the clamping roller 64 through the PLC component 29 selectively to urge the workpiece 16 sidewardly against the powered roller 56 and the guide roller 58, and conversely, to release the workpiece from engagement with the powered roller and the guide roller. The clamping roller 64 may be displaced by cylinders 66, 68, which may take the form of double-acting hydraulic cylinders or double-acting pneumatic cylinders, each of which may be actuated by the PLC component 29 of the computer control 28. As shown in FIG. 1, the cylinders 66, 68 may be oriented such that cylinder 66 is an upper cylinder and cylinder 68 is a lower cylinder. The attachment of the cylinders 66, 68 to the second upright support 44 may be a pivotal attachment, or may be fixed, as by bolting directly to the second upright support.

The workpiece feeder 14 may include a clamping roller retainer 70 that is slidably mounted on the linear rail 30 of the gantry 18. In an embodiment, the linear rail 30 may include parallel, opposing grooves 72, extending longitudinally and formed on opposing inner surfaces thereof, that may receive and retain parallel, opposing longitudinal ribs 74 protruding from an upper end of the clamping roller retainer 70. The clamping roller 64 may be rotatably mounted on the clamping roller retainer 70 and the cylinders 66, 68 attached to a side of the clamping roller retainer 70 opposite the clamping roller 64. Accordingly, when the cylinders 66, 68 are actuated by the computer control 28, the clamping roller retainer 70 may be displaced linearly along the linear rail 30 of the gantry 18 beneath the slide 20 toward and away from the workpiece 16, the powered roller 56, and the guide roller 58.

As shown in FIGS. 1 and 2, the powered roller 56, the guide roller 58, and the clamping roller 64 rotate about substantially vertical axes C, D, and E, respectively. The substantially vertical axes C, D, and E are substantially parallel to each other, and substantially perpendicular to the workpiece feed direction indicated by arrow A. As shown in FIG. 2, the rotational axis E of the clamping roller 64 is offset from (i.e., is not on a line perpendicular to arrow A with) the rotational axis C of the powered roller 56, and is offset from the rotational axis D of the guide roller 58. Consequently, the clamping roller 64 may urge the workpiece 16 sidewardly against both the powered roller 56 and the guide roller 58, thereby preventing the workpiece from skewing relative to the feed direction indicated by arrow A.

As shown in FIG. 1, the robot arm 22 may include a swivel base 76 rotatably mounted on the upper surface 24 of the slide 20 to rotate about a vertical axis F, a lower arm 78 pivotally attached to the swivel base, an upper arm 80 pivotally attached to the lower arm, and arm roll 82 rotatably attached to the upper arm to rotate about an axis G, and a wrist bend 84 rotatably attached to the arm roll to rotate about an axis H, and a tool flange 86 pivotally and rotatably attached to the arm roll. Accordingly, the robot arm 22, the slide 20, and the workpiece feeder 14 collectively provide at least eight degrees of freedom to the end effector 26. Examples of such a robot arm 22 include Yaskawa Motoman Model MH24, Model HP20, and Model HP2OR; Kawasaki Model RS10L, and Model RS15X; Fanuc ArcMate Models 120iC and 120iC-10L; KUKA Models KR16 and KR16L8; and ABB Model IRB2600 ID. The described embodiment utilizes a Yaskawa Motoman MH24 robot, the specifications of which are set forth in Yaskawa technical specification sheet DS-601-A published January 2015, the entire contents of which are incorporated herein by reference.

The slide 20 may include an energy chain connector 88 that carries power cables and, if necessary, gas and/or air lines to the robot arm 22 and end effector 26. The energy chain 88 may be attached to the computer control 28 which may be connected to sources of power and various gases (not shown) for performing machining operations. An available energy chain 88 is E4 Series, fully enclosed, by igus Inc. of Cologne, Germany.

Figure 3:
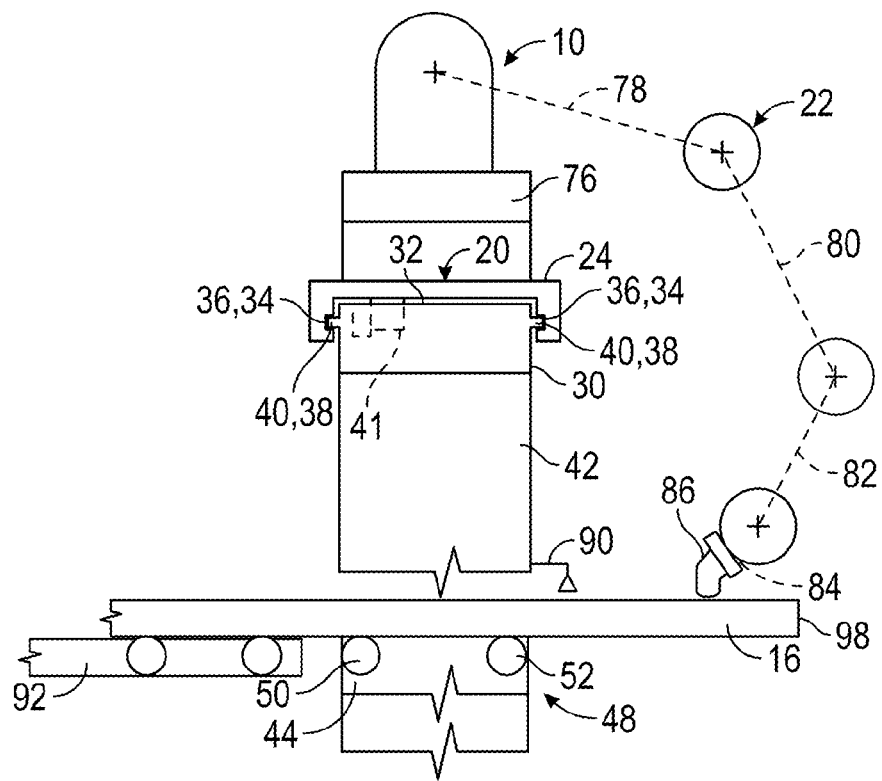
FIG. 3 is a schematic, side elevation showing a position of the robot arm and end effector relative to a workpiece passing beneath the gantry.

As shown in FIG. 3, the system 10 may include a sensor 90 that may be mounted on an upright 42 (FIG. 1) and connected to the PLC component 29 of the computer control (see FIG. 5). The sensor 90 may be positioned to detect the position of the workpiece 16 as it leaves a feed conveyor, generally designated 92, upstream of the gantry robot system 10, and passes beneath the gantry 18 to a position where the predetermined machining operation is to occur. The sensor 90 also detects when the trailing edge leaves the workpiece roller support 48 of the system 10, so that the PLC component 29 may signal to the computer control 28 that the workpiece 16 is clear and to deactivate the predetermined machining process.

As shown in FIGS. 1 and 3, the robot arm 22 may be manipulated by the computer control 28 to perform a machining operation on the workpiece 16 at a variety of locations on the workpiece. The improved flexibility of the system 10 is shown best in FIG. 4. By displacing the slide 20 along the upper surface 32 of the linear rail 30 of the gantry 18, the robot arm 22 may be positioned to perform machining operations on an underside of the workpiece 16 without having to move the workpiece itself from its position shown in FIG. 1. Consequently, the workpiece 16 may remain stationary, or in applications will not have to be rotated or tilted about a longitudinal axis, or elevated or declined from a substantially horizontal orientation, while the robot arm 22 is displaced by the computer control 28 along the rail 30 to enable the end effector 26 to perform machining operations even on an underside or bottom surface 92 of the workpiece 16 without moving the workpiece from its position in which the robot arm positions the end effector to perform machining operations on the upper or top surface 94 of the workpiece.

Figure 4:
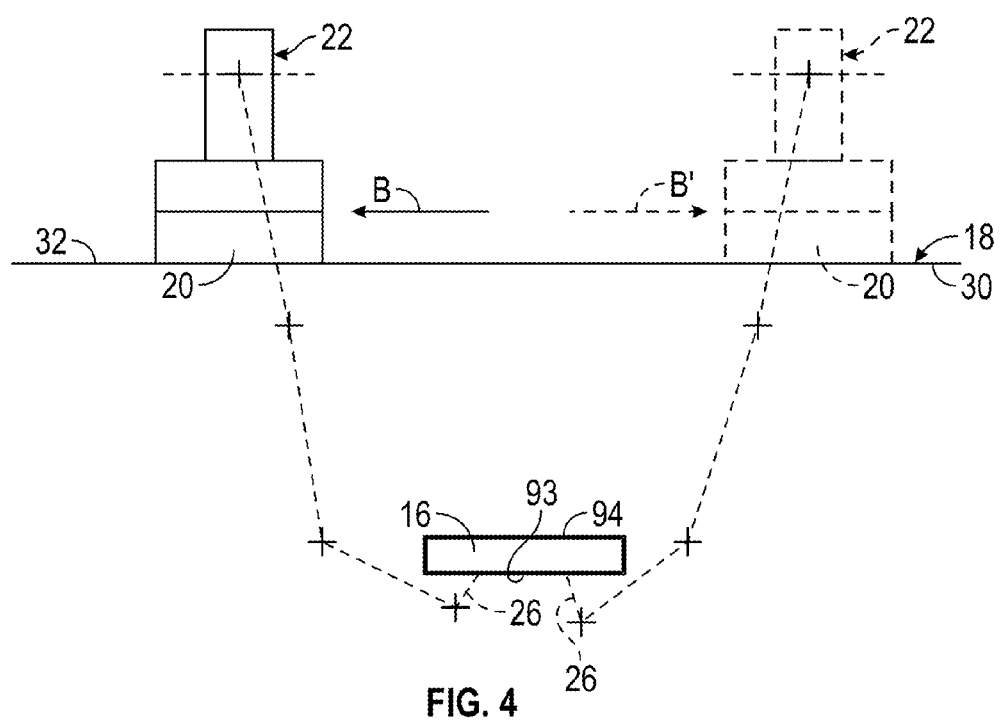
FIG. 4 is a schematic front elevational view of the gantry robot system of FIG. 1, showing movement of the slide relative to the gantry and different positions of the robot arm.

For example, by moving the slide 20 in the direction of arrow B in FIG. 4, the robot arm 22 may be manipulated by the computer control 28 to reach an underside 93 of the workpiece 16; that is, to the left of the workpiece as shown in FIG. 4. Conversely, by movement of the slide 20 in the direction of arrow B', the robot arm 22 may be positioned to reach an underside surface 93 of the workpiece 16 with the end effector 26 that is to the right of the workpiece, all without moving the spatial location of the workpiece 16 to perform either operation. Although gantry robots of this type typically may be used for overhead work processes, the disclosed gantry robot system 10 may be sufficiently flexible to perform machining operations on an underside surface 93 of a workpiece 16, without having to move the workpiece spatially relative to the system 10.

The operation of the gantry robot system 10 is described schematically in FIG. 6. The computer control 28 may be programmed to perform a machining operation and may employ known software, such as StruCIM, to create a cutting program from a supplied CAD file having the predetermined machining operation. As indicated at block 101, a set of commands for a preselected machining operation may be loaded into the computer control 28. As indicated in block 96, the workpiece 16, which may take the form of a flat plate of metal such as steel, may be offloaded from a feed conveyor 92 (see FIG. 3) until the plate engages the powered feed roller 56 (FIG. 1) and guide roller 58. The cylinders 66, 68 may be actuated by the computer control 28 to urge the clamping roller 64 against the feed roller 56 and guide roller 58, as shown in FIG. 1. The feed roller 56 then may be actuated by the computer control 28 to feed the workpiece 16 in the feed direction indicated by arrow A (see FIG. 2) until the leading edge 98 (see FIG. 3) of the workpiece is detected by the sensor 90, as indicated by block 100.

Although shown prior to block 96 in FIG. 6, the step of block 101 may be performed prior to detecting the position of the leading edge of the workpiece of block 100, or at another appropriate time in the sequence of steps of FIG. 6. Indeed, the program of block 101 may be pre-loaded in the computer control 28 prior to the system 10 receiving workpiece 16.

Next, the slide 20 may be positioned along the linear rail 30 in a position shown in FIG. 1 or 4, or a position intermediate or different from the position shown in those figures for best positioning of the robot arm 22, as indicated in block 102. The robot arm 22 may then be actuated by the computer control 28, as indicated in block 104, to position the end effector 26 to perform the machining operation, which in an embodiment may include cutting with a plasma torch. As indicated in block 106, when the articulated arm 22 is positioned appropriately, then as indicated in block 106 the end effector 26 is actuated to perform the machining operation.

The machining operation, which may be directed by commands from the program instructions loaded into the computer control 28, may cause the slide 20 to move along the linear rail 30, the robot arm 22 to swivel on the slide, and the arm to position the end effector 26 at a location, or at a series of locations on the workpiece 16, or to perform a machining operation, or a continuous machining operation, such as a continuous cut or series of cuts, on the workpiece. The commands loaded into the computer control 28 in block 101 also may cause the feed roller 56 of the workpiece feeder 14 to rotate alternately in a forward and a reverse direction, and/ or a series of combinations of forward and reverse directions, and/or a series of forward directions, each of which may be of a different distance, simultaneously with movement of the robot arm 22, and/or slide 20, and/or end effector 26, to position the workpiece 16 at a predetermined location for the machining operation or operations. Thus, the computer control 28 actuates the feed roller 56 and workpiece feeder 14, the gantry 18 and slide 20, the robot arm 22, and the end effector 26 to act together in a coordinated manner to perform a preselected machining operation on a workpiece 16. The preselected machining operation may be selected from a table or library of machining operations, or may be programmed into the computer control by an operator.

The computer control 28 may indicate the completion of the machining operation, as indicated in block 108, by an indicator light (not shown) and/or a tone or chime, whereupon the machined workpiece 16 may be offloaded, for example, by placing it on a downstream conveyor (not shown) adjacent the gantry robot system 10, indicated at block 110. The robot arm 22 may be actuated by the computer control 28 to move the end effector 26 away from the now-finished workpiece 16 to allow the workpiece to be removed from the system 10.

This disclosure also encompasses a method for making the gantry robot system 10. The method may include forming the workpiece support 12 having the workpiece feeder 14 for guiding the workpiece 16 a first direction relative to the workpiece support. The gantry 18 may be positioned above, and in embodiments mounted on, the workpiece support 12. The slide 20 may be mounted on the gantry 18 for movement along the top surface 32 thereof in a second direction substantially perpendicular to the first direction of the workpiece 16. An articulated robot arm 22 is mounted on the upper surface 24 of the slide 20 for rotational movement relative to the slide. The end effector 26 may be attached to the robot arm. A computer control 28 may be connected to actuate the workpiece feeder 14, the slide 20, the robot arm 22, and the end effector 26.

Figure 7:
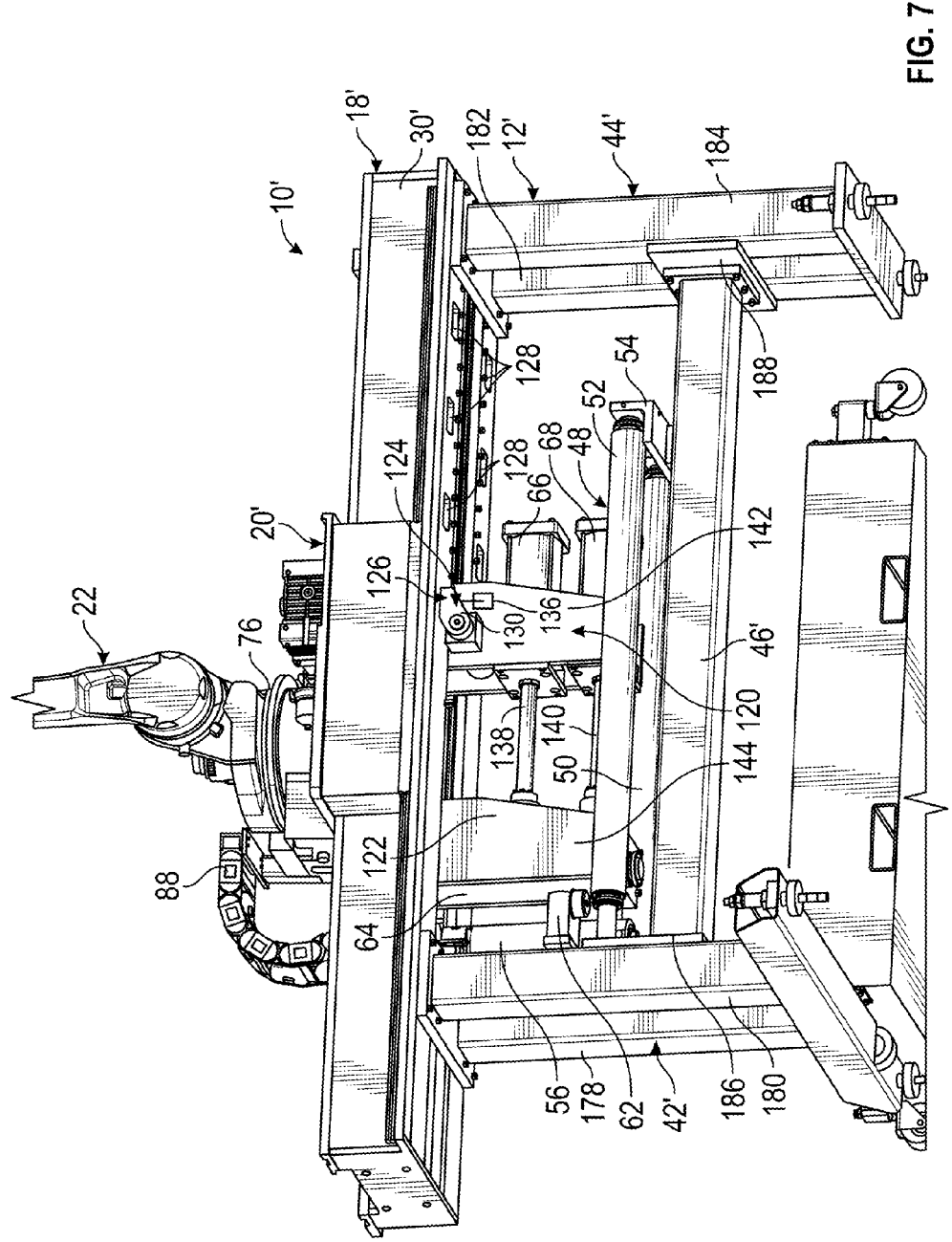
FIG. 7 is a perspective, schematic view of another aspect of the disclosed gantry robot system.
Figure 8:
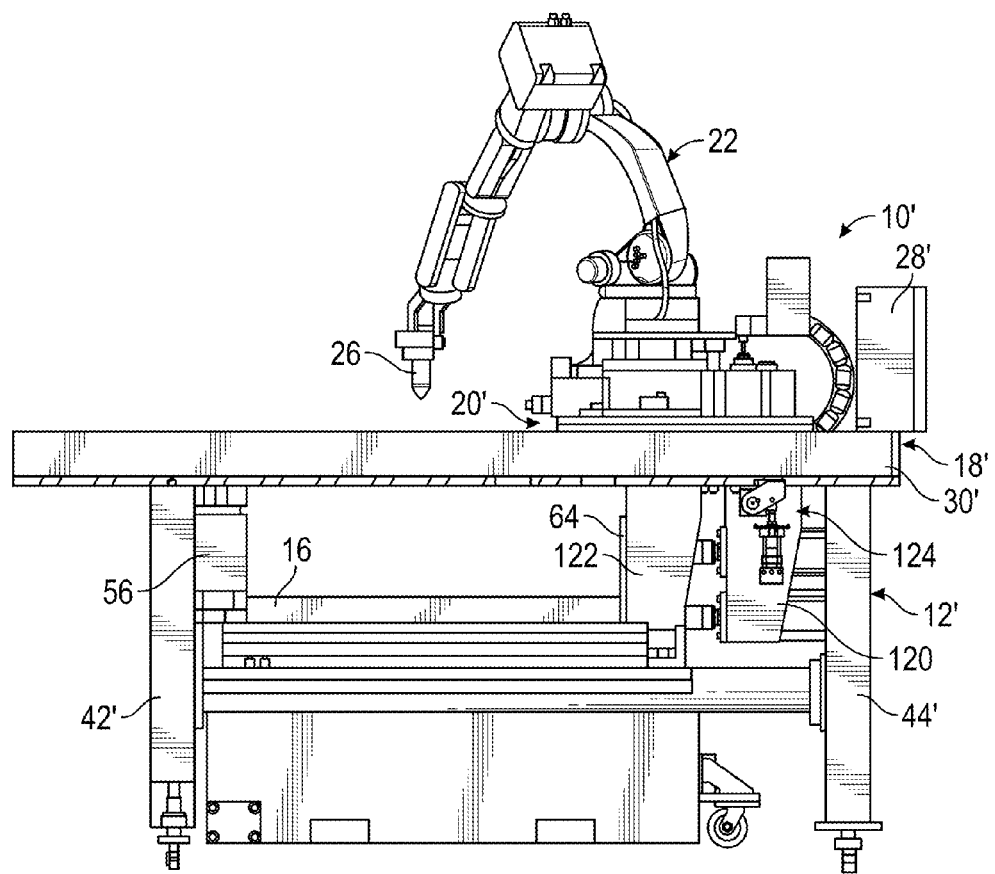
FIG. 8 is a schematic, side elevation of the aspect shown in FIG. 7.

FIGS. 7 and 8 show a second or alternate aspect of the disclosed gantry robot system generally designated 10'. The robot gantry system 10' may include a gantry 18', a slide 20' movably mounted on the gantry, an articulated arm 22 mounted on the slide for performing a machining operation, and a workpiece support 12' that includes a workpiece feeder 14' for moving a workpiece 16 relative to the gantry. The articulated arm 22 may be the same as disclosed and described with respect to FIGS. 1-4. The workpiece feeder 14' may include a first guide element 120 mounted on and selectively positionable on the gantry 18', and a second guide element 122 movably mounted on the gantry. The second guide element 122 may be connected to and selectively positionable by the first guide element 120 to engage workpieces 16 of varying widths.

A computer control 28' (see also FIG. 5) may be connected to actuate the slide 20', the articulated arm 22 and the workpiece feeder 14' in a coordinated manner to perform a preselected machining operation on the workpiece 16. The preselected machining operation may take the form described and shown herein with reference to FIGS. 3-6. The preselected machining operation may be selected from a table or library of different machining operations stored in computer control 28', or programmed into computer control manually by an operator, or transmitted to or loaded into computer control wirelessly, or by wire, or by downloading from or connecting a portable data storage device, such as a thumb drive, to the computer control.

In an embodiment, the gantry 18' may include a linear rail 30'. The slide 20' may be movably mounted on the linear rail 30', and the workpiece feeder 14' mounted on the gantry 18' below the slide. The first guide element 120 may include a detent, generally designated 124, for selectively engaging the gantry 18' to fix the first guide element at a selected position relative to the linear rail 30'. In an embodiment, the detent 124 may include a pawl 126 pivotally attached to the first guide element 120. The linear rail 30' may include a plurality of sockets 128, formed in the underside of, and spaced along, the linear rail. In an embodiment, the sockets 128 are arranged in pairs spaced along the underside of the linear rail 30' (see FIG. 7). In other embodiments, the detent 124 may take the form of a pin and linear actuator, and the sockets 128 may take the form of recesses in the linear rail 30' itself, or rings or sleeves attached to the linear rail.

The sockets 128 may be shaped and positioned to be selectively engaged by the pawl 126. In an embodiment, the pawl 126 may take the form of a pair of pawl elements, which may take the form of first and second pawl elements 130, 132, respectively (see FIGS. 9 and 10), positioned on either side of the first guide element 120 and aligned to engage a selected pair of the pairs of sockets 128. The first and second pawl elements 130, 132, respectively, may be similarly shaped and connected by and fixed on a transverse shaft 134 that passes through the first guide element 120, so that the first and second pawl elements 130, 132 move in unison to engage or disengage associated, selected ones of the sockets 128, which may be formed in pairs along the linear rail 30' on either or both sides of the first guide element (FIG. 7). As shown in FIG. 10, the first guide element 120 may include a second actuator 136 for pivoting the pawl 126 to selectively engage, and disengage from, a selected one or ones of the plurality of sockets 128. As indicated schematically in FIG. 5, the second actuator 136 may be manually operated, for example, at a control panel that forms part of the computer control 28', or may be actuated as part of a preselected, stored program accessed by the computer control.

The first guide element 120 may include a first actuator, which in the embodiment shown may take the form of first and second double-acting cylinder actuators 66, 68, respectively, for selectively positioning the second guide element 122 relative to the linear rail 30'. The cylinder actuators 66, 68 may include rods 138, 140, respectively, that are connected to the second guide element 122. Also in an embodiment, the first guide element 120 may include an actuator support 142. The actuators 66, 68 may be mounted on the actuator support 142, and the actuator support may be selectively positionable along the linear rail 30' of the gantry 18'.

As shown in FIGS. 7 and 8, the second guide element 122 may include a clamping roller 64 for engaging the workpiece 16 as it passes beneath the linear rail 30'. The clamping roller 64 may be rotatably mounted on a clamping roller support 144, which forms part of the second guide element 122. The clamping roller support 144 may be slidably mounted on the linear rail 30', as will be described in greater detail.

The workpiece feeder 12' also may include a driven feed roller 56 mounted on the gantry 18' opposite the clamping roller 64 (see also FIG. 1), such that the workpiece 16 may pass between the driven feed roller and the clamping roller. The computer control 28' may actuate the first actuator in the form of cylinder actuators 66, 68 to displace the second guide element 122 relative to the linear rail 30' so that the clamping roller 64 urges the workpiece 16 against the driven feed roller 56. The workpiece feeder 12' also may include a guide roller 62 rotatably mounted on the gantry 18' opposite the clamping roller 64 and adjacent the driven feed roller 56. The guide roller 62 may freewheel and allow the workpiece 16 to be aligned between the driven feed roller 56 and the clamping roller 64, as shown in FIG. 2. Once the workpiece 16 is clamped between the clamping roller 64 on one side, and the driven roller 56 and guide roller 62 on an opposite side, the driven feed roller 56 may be actuated by the computer control 28' to rotate to drive the workpiece 16 to pass beneath the linear rail 30' to a predetermined position relative to the slide 20' and robot articulated arm 22 for machining by the robot articulated arm.

As shown in FIG. 7, the workpiece feeder 14' of the workpiece support 12' may include a support member that may take the form of a roller support 48 mounted on the gantry 18' below the linear rail 30'. The roller support 48 may be positioned between the clamping roller 64 and the driven feed roller 56. In the aspect shown in FIG. 7, the roller support 48 may take the form of a pair of support rollers 50, 52 mounted on the gantry 18'. The support rollers 50, 52 may be freewheeling, and positioned to support the workpiece 16 passing beneath the linear rail 30' (see FIG. 8). The support rollers 50, 52 may be rotatably mounted at one end to an L-bracket 54, which in turn is mounted on the lower transverse brace 46' of the gantry 18'. The support rollers 50, 52 may be rotatably mounted at their opposite ends on the second upright support 42'. The support rollers 50, 52 may be spaced apart sufficiently to allow the first and second guide elements 120, 122, respectively, to extend downwardly between them.

Figure 9:
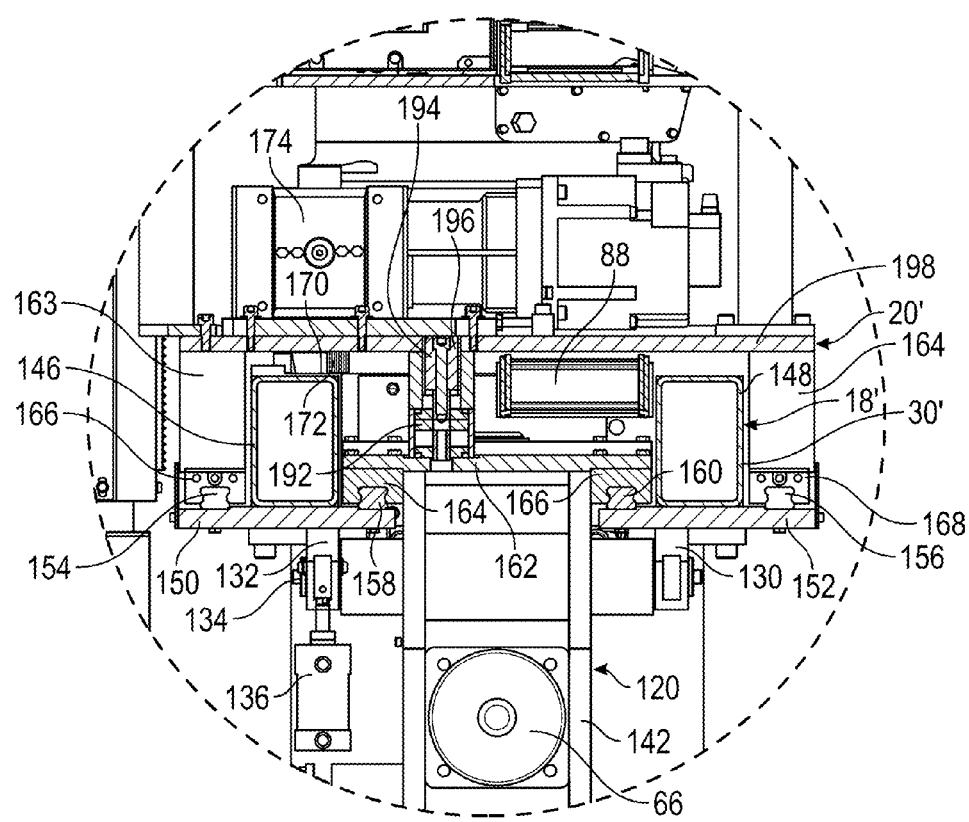
FIG. 9 is a detail end elevational view of the gantry robot system shown in FIG. 7.
Figure 10:
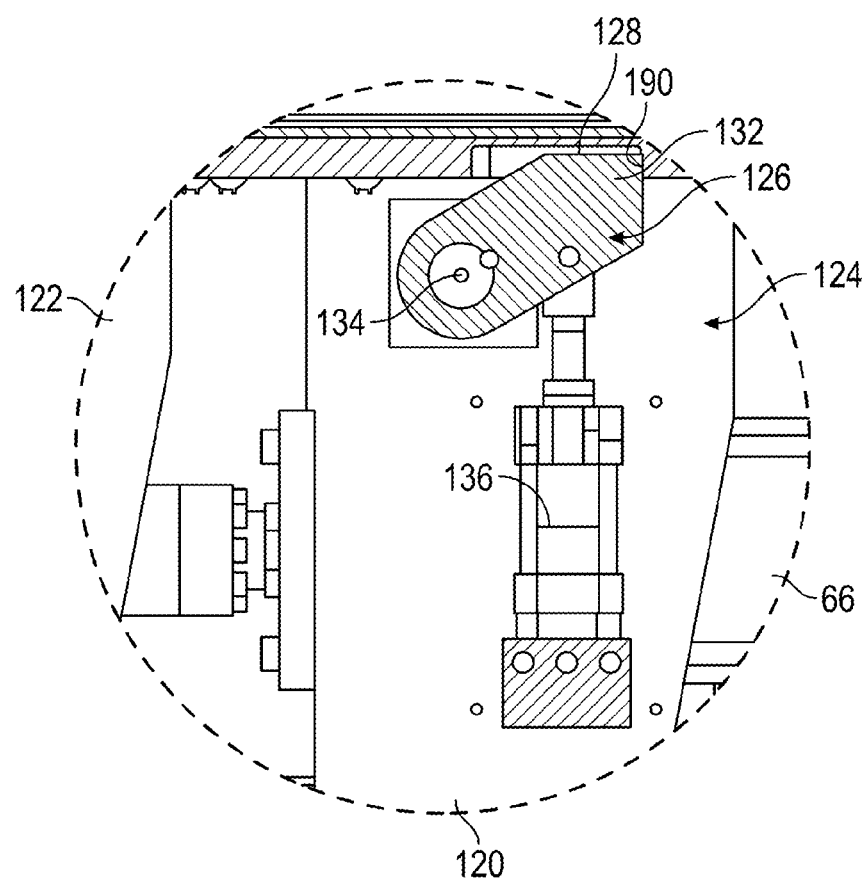
FIG. 10 is a detail showing the pawl engagement system of the gantry robot system of FIG. 7.

As shown in FIG. 9, the first guide element 120 may be mounted on, and in embodiments suspended from and selectively slidably positionable relative to, the linear rail 30'. Similarly, the second guide element 122 may be mounted on, and in embodiments suspended from and selectively slidably positionable relative to the linear rail 30'. The first and second guide elements 120, 122, respectively, may be positioned on the linear rail 30' by the slide 20', as will be described. The gantry 18' may include a linear rail 30' that is made up of first and second box beams 146, 148, respectively. Support flanges 150, 152 may be attached to the box beams 146, 148, and extend the entire length of the box beams. The outboard surfaces of the flanges 150, 152 may support slide rails 154, 156, and an inboard portion of the flanges supports guide element rails 158, 160.

The first guide element 120 may include a top panel 162 having brackets 164, 166 that engage the guide element rails 158, 160, respectively. Although not shown, the clamping roller support 144 of the second guide element 122 also may include brackets similar in shape, position, and function to brackets 158, 160 that engage and are supported upon the rails 158, 160. Accordingly, first and second guide elements 120, 122, respectively, slide along the rails 158, 160 and thereby are slidably mounted on the linear rail 30' of the gantry 18'. Alternatively, the clamping roller support 144 of the second guide element 122 may slide along opposing rails 74, as shown in FIG. 1.

The slide 20' may include support blocks 163, 164, connected to and joined together by support plate 198. Swivel base 76 (FIG. 7) may be mounted on support plate 198. Blocks 163, 164 may include brackets 166, 168, respectively, that slidably engage the outboard rails 154, 156. Accordingly, the slide 20' may be mounted on the rails 154, 156 and slide relative to the linear rail 30' along the rails 154, 156. A linear rack 170 may be mounted on the upper surface of the box beam 146. The rack 170 may be engaged by a pinion 172 driven by a motor 174, mounted on the support plate 198, that receives power from the energy chain connector 88. Energy chain connector 88 may be controlled by the computer control 28' and selectively supply power to control the powered roller 56, the pawl 126, and the actuators 66, 68 according to a preselected program, or manually from a control panel that is part of the computer control.

In an embodiment, the first and second guide elements 120, 122, respectively, may be temporarily attached to the slide 20' and slid along the rails 158, 160 by displacing the slide to position the first and second pawl elements 130, 132, respectively, adjacent a selected pair of the sockets 128 formed in the linear rail 30'. When so positioned, the first and second pawl elements 130, 132, respectively, may be moved into and out of engagement with the sockets 128 by the second actuator 136. As shown in FIG. 9, the guide element 120 may include a double-acting cylinder 192 mounted on the top panel 162 that reciprocates a pin 194 into and out of engagement with a correspondingly shaped hole 196 formed in the top plate 198 of the slide 20'. The double-acting cylinder 192 may be either hydraulic or pneumatic, and actuated by the computer control 28', either as part of a preselected program, or manually at a control panel that is part of the computer control.

In either case, the first and second guide elements 120, 122, respectively, may be positioned at selected locations along the linear rail 30' by the computer control 28' first positioning the slide 20' on the linear rail so that the hole 196 aligns with the pin 194. The double-acting cylinder 192 is then actuated by the computer control 28' to move the pin 194 upwardly into the hole 196 to engage plate 198 and connect the first guide element 120 to the slide 20'. Displacement of the slide 20', by the computer control 28' actuating the motor 174 to rotate the pinion 172 to move the slide along the rack 170, and hence along the linear rail 30', slides the first guide element 120 along the linear rail with it. The second guide element 122, which is connected to the first guide element 120 by the first and second cylinders 66, 68, respectively, slides along the linear rail 30' with the first guide element 120. The slide 20' and first and second guide elements 120, 122, respectively, are shown in different positions relative to the linear rail 30' in FIGS. 7 and 8.

As shown in FIG. 7, in an embodiment the first upright support 42' may include first and second upright support members 178, 180, respectively, and similarly, second upright support 44' may include first and second upright support members 182, 184, respectively. The lower transverse brace 46' may include mounting plates 186, 188 that are attached to the first and second upright support members 178, 180, and 182, 184 by means such as bolts, welding, or other conventional means.

The operation of the gantry robot system 10' may begin with positioning the first guide element 120 relative to the gantry 18' by sliding the first guide element and second guide element 122 manually along the linear rail 30' until the first and second pawl elements 130, 132, respectively, of the detent 124 are aligned with a selected pair of sockets 128 on the underside of the linear rail 30'. The second actuator 136 is activated by the computer control 28' to pivot the first and second pawl elements 130, 132, respectively, into the selected pair of sockets 128 (see FIG. 8).

The computer control 28' may then actuate the first and second cylinders 66, 68, respectively to withdraw their respective rods 138, 140, thereby drawing the second guide element 122 away from the driven roller 56 and guide roller 62. The workpiece 16, which may take the form of a plate, may be fed beneath the linear rail 30', where it may be supported on support rollers 50, 52. The first and second cylinders 66, 68, respectively, may be actuated by the computer control 28' to extend their respective rods 138, 140, displacing the second guide element 122 toward the driven roller 56 and guide roller 62, causing the clamping roller 64 to contact the adjacent edge of the workpiece 16 and urge the opposite edge of the workpiece against the driven roller and guide roller, which engagement aligns the workpiece to be perpendicular to the linear rail 30' (see FIG. 2). The reactive force of the clamping roller 64 pushing the workpiece 16 against the driven roller 56 and guide roller 62 may be borne by the engagement of the first and second pawl elements 130, 132, respectively, of the detent 120 against the walls defining the selected pair of sockets 128 of the linear rail 30' engaged by the first and second pawl elements, and especially the walls 186 of the sockets 128 (only one is shown in FIG. 10) opposite the second guide element 122.

The computer control 28' may activate the driven roller 56 to advance the workpiece 16 until detected by the sensor 90 (see FIG. 3). The preselected program of machining, which may have been loaded into the computer control 28' previously (see box 101, FIG. 6), then causes the computer control to move the slide 20' and robot arm 22 in a coordinated manner to position the end effector 26 (see FIG. 1) to perform a preselected machining operation or operations. After the machining operation is completed, the finished workpiece 16 may be advanced from the robot gantry 10' by the driven roller 56 to a conveyor, platform, truck, or other receiving apparatus. Subsequent machining operations may be performed on other workpieces 16. Repositioning of the first and second guide elements 120, 122, respectively, to accommodate subsequent workpieces 16 of varying widths, may be performed between machining operations if necessary. Repositioning requires disengagement of the first and second pawl elements 130, 132 of the detent 126 from the engaged pair of sockets 128 by activation of the second actuator 136, displacement of the first and second guide elements 120, 122, respectively, along the linear rail 30' to align the first and second pawl elements 130, 132, respectively, with a selected pair of sockets 128, then activating the second actuator 136 to pivot the first and second pawl elements to engage the adjacent selected pair of sockets. Repositioning of the first and second guide elements 120, 122, respectively, may make the distance between the clamping roller 56 and powered roller 56 wider or narrower.

The gantry robot system 10' may be assembled by forming a gantry 18' having a linear rail 30', first and second upright supports 42', 44', respectively, that support the linear rail, and a lower transverse brace 46' attached to and extending between the upright supports. The slide 20' may be movably mounted on the linear rail 30' of the gantry 18'. The articulated arm 22 may be mounted on the slide. The articulated arm 22 may be adapted to receive an end effector 26 (FIGS. 1 and 8) for performing a machining operation.

The first guide element 120 may be mounted on the gantry 18'. The first guide element 120 may form a component of a workpiece feeder 14' of the workpiece support 12' and include an actuator in the form of cylinder actuators 66, 68. A second guide element 122 may be mounted on the gantry 18', and connected to the actuators 66, 68 of the first guide element 120. The computer control 28' may be connected to control the slide 20', the articulated arm 22, and the actuators 66, 68. The computer control 28 may be programmed to actuate the workpiece feeder 14', the slide 20', and the articulated arm 22 in a coordinated manner to displace the second guide element 122 to engage and move a workpiece 16 relative to the linear rail 30', and the articulated arm 22 to enable the end effector 26 to perform a preselected machining operation on the workpiece 16.

While the forms of apparatus and methods described herein constitute preferred embodiments of the disclosed gantry robot system, it is to be understood that the disclosure is not limited to these precise apparatus and methods, and that modifications may be made therein without departing from the scope of the invention as defined in the claims.

What is claimed is:

1. A gantry robot system, comprising:
   a gantry;
   a slide movably mounted on the gantry;
   an articulated arm mounted on the slide for performing a machining operation;
   a workpiece feeder for moving a workpiece relative to the gantry, the workpiece feeder having a first guide element mounted on and selectively positionable on the gantry, and a second guide element movably mounted on the gantry, the second guide element connected to and selectively positionable by the first guide element to engage workpieces of varying widths; and
   a computer control connected to actuate the slide, the articulated arm, and the workpiece feeder in a coordinated manner to perform a preselected machining operation on the workpiece.

2. The gantry robot system of claim 1, wherein the gantry includes a linear rail; the slide is movably mounted on the linear rail; and the workpiece feeder is mounted on the gantry below the slide.

3. The gantry robot system of claim 2, wherein the first guide element includes a detent for selectively engaging the gantry to fix the first guide element at a selected position relative to the linear rail.

4. The gantry robot system of claim 3, wherein the detent includes a pawl pivotally attached to the first guide element; and the linear rail includes a plurality of sockets spaced along the linear rail shaped and positioned to be selectively engaged by the pawl.

5. The gantry robot system of claim 4, wherein the first guide element includes a second actuator for pivoting the pawl to selectively engage and disengage from a selected one of the plurality of sockets.

6. The gantry robot system of claim 5, wherein the second guide element includes a clamping roller for engaging the workpiece as it passes beneath the linear rail.

7. The gantry robot system of claim 2, wherein the workpiece feeder includes a driven feed roller mounted on the gantry opposite the clamping roller such that the workpiece passes between the driven feed roller and the clamping roller.

8. The gantry robot system of claim 7, wherein the driven feed roller is actuated by the computer control to cause the workpiece to pass beneath the linear rail to a predetermined position.

9. The gantry robot system of claim 8, wherein the first guide element includes a first actuator for selectively positioning the second guide element relative to the linear rail.

10. The gantry robot system of claim 9, wherein the first actuator includes a first double-acting cylinder actuator connected to the second guide element.

11. The gantry robot system of claim 10, wherein the first guide element includes an actuator support; the actuator is mounted on the actuator support; and the actuator support is selectively positionable on the gantry.

12. The gantry robot system of claim 11, wherein the computer control actuates the first actuator to displace the second guide element relative to the linear rail so that the clamping roller urges the workpiece against the driven feed roller.

13. The gantry robot system of claim 12, wherein the workpiece feeder includes a guide roller rotatably mounted on the gantry opposite the clamping roller and adjacent the driven feed roller.

14. The gantry robot system of claim 7, wherein the first guide element is suspended from, and is selectively positionable relative to, the linear rail.

15. The gantry robot system of claim 14, wherein the second guide element is slidably mounted on the linear rail.

16. The gantry robot system of claim 15, further comprising a workpiece support having a support member mounted on the gantry below the linear rail.

17. The gantry robot system of claim 16, wherein the support member is positioned between the clamping roller and the driven feed roller.

18. The gantry robot system of claim 17, wherein the support member includes a pair of support rollers mounted on the gantry, the pair of rollers positioned to support a workpiece passing beneath the linear rail.

19. A gantry robot system, comprising:
a gantry having a linear rail, first and second upright supports supporting the linear rail, and a lower transverse brace attached to and extending between the upright supports;
a slide movably mounted on the gantry;
an articulated arm mounted on the slide and adapted to receive an end effector for performing a machining operation on a workpiece;
a workpiece feeder having a first guide element mounted and selectively positionable along the linear rail, and a second guide element movably mounted on the linear rail, the second guide element connected to and selectively positionable by the first guide element along the linear rail to accommodate a width of the workpiece and engage the workpiece to move the workpiece relative to the gantry; and
a computer control connected to actuate the workpiece feeder, the first guide element of the workpiece feeder, the slide, and the articulated arm in a coordinated manner such that the end effector in positioned to perform a preselected machining operation on the workpiece.

20. A method for making a gantry robot system, the method comprising:
forming a gantry having a linear rail, first and second upright supports supporting the linear rail, and a lower transverse brace attached to and extending between the upright supports;
mounting a slide movably on the linear rail of the gantry;
mounting an articulated arm on the slide that is adapted to receive an end effector for performing a machining operation;
mounting a selectively positionable first guide element of a workpiece feeder on the gantry, the first guide element having an actuator;
mounting a second guide element on the gantry, and connecting the second guide element to the actuator of the first guide element; and
connecting a computer control to the slide, the articulated arm, and the actuator, and programming the computer control to actuate the workpiece feeder, the slide, and the articulated arm in a coordinated manner to displace the second guide element to engage and move a workpiece relative to the linear rail, and the articulated arm to enable the end effector to perform a preselected machining operation on the workpiece.

* * * * *